(12) United States Patent
Rangarajan

(10) Patent No.: US 10,838,790 B2
(45) Date of Patent: *Nov. 17, 2020

(54) MEMORY POISONING WITH HINTS

(71) Applicant: Intel Corporation, Santa Clara, CA (US)

(72) Inventor: Thanunathan Rangarajan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/235,949

(22) Filed: Dec. 28, 2018

(65) Prior Publication Data

US 2019/0138379 A1    May 9, 2019

Related U.S. Application Data

(63) Continuation of application No. 16/036,902, filed on Jul. 16, 2008, now Pat. No. 10,565,039, which is a continuation of application No. 13/709,290, filed on Dec. 10, 2012, now Pat. No. 10,025,647.

(51) Int. Cl.
*G06F 11/00* (2006.01)
*G06F 11/07* (2006.01)

(52) U.S. Cl.
CPC .......... *G06F 11/004* (2013.01); *G06F 11/073* (2013.01); *G06F 11/0763* (2013.01); *G06F 11/0775* (2013.01)

(58) Field of Classification Search
CPC .................... G06F 11/073; G06F 11/1076
See application file for complete search history.

(56) References Cited

U.S. PATENT DOCUMENTS

| | | | |
|---|---|---|---|
| 6,035,436 A | 3/2000 | Wu et al. | |
| 6,405,322 B1 | 6/2002 | Gaither et al. | |
| 6,519,736 B1 | 2/2003 | Chen et al. | |
| 6,594,785 B1 | 7/2003 | Gilbertson et al. | |
| 7,171,591 B2 | 1/2007 | Chen et al. | |
| 8,671,309 B2 | 3/2014 | Raj et al. | |
| 10,025,647 B2 | 7/2018 | Rangarajan | |
| 2006/0149940 A1 | 7/2006 | Mukherjee et al. | |
| 2006/0150009 A1 | 7/2006 | Takemori et al. | |
| 2011/0078492 A1 | 3/2011 | Kumar et al. | |
| 2014/0006904 A1 | 1/2014 | Gendler et al. | |
| 2014/0298140 A1 | 10/2014 | Yigzaw et al. | |
| 2019/0108080 A1* | 4/2019 | Rangarajan | G06F 11/004 |
| 2019/0138378 A1* | 5/2019 | Rangarajan | G06F 11/004 |
| 2019/0138379 A1* | 5/2019 | Rangarajan | G06F 11/004 |

\* cited by examiner

*Primary Examiner* — Philip Guyton
(74) *Attorney, Agent, or Firm* — Alliance IP, LLC

(57) ABSTRACT

A method and system for storing hints in poisoned data of a computer system memory includes receiving poisoned data in a component of the system; forwarding the poisoned data to a memory controller of the system; and forwarding additional data regarding the poisoned data to a memory controller. The memory controller writes the poisoned data to the system memory wherein the written poisoned data includes a poison signature and a hint based on the additional data regarding the poisoned data; and when the written poisoned data is read signaling a system error and returning the poison signature and the hint to a system software of the system.

24 Claims, 5 Drawing Sheets

MEMORY POISONING WITH HINTS

CROSS-REFERENCE TO RELATED APPLICATIONS

This Application is a continuation of U.S. application Ser. No. 16/036,902, filed on Jul. 16, 2018, and entitled MEMORY POISONING WITH HINTS, which application claims the benefit of priority to U.S. application Ser. No. 13/709,290, filed on Dec. 10, 2012, and entitled MEMORY POISONING WITH HINTS, now issued as U.S. Pat. No. 10,025,647, which claims priority to Indian Application No. 2621/CHE/2012, filed on Jun. 30, 2012, and entitled MEMORY POISONING WITH HINTS. The disclosures of these related prior applications are considered part of and are hereby incorporated by reference in their entirety in the disclosure of this Application.

BACKGROUND INFORMATION

In computer systems Memory Poisoning refers to the process of storing a special signature in memory to identify bad or corrupted memory data and warn the system when this bad data is eventually read, thereby enabling Enhanced Error Containment and Recovery (EECR). There are several conditions that can give rise to bad memory data, for example:

PCI Express packets with corrupted data received from a PCI Express endpoint performing a direct memory access write operation; or Cache lines with corrupted data received from the last level cache, e.g., data corruption during the process of write-back operations.

In current implementations, memory poisoning involves storing a special poison signature to identify the poisoned memory data. For example, an implementation could set the data bits all to 0's, and the parity bits all to 1's. In such an implementation, the poisoned data itself doesn't convey any further meaning to the system. Therefore, the main function of memory poisoning in current implementations today is restricted to allowing the memory controller to store corrupted data in memory as a poison that is unusable, such that the memory controller can recognize the presence of the corrupted data on a subsequent access to the data, reject the request and raise an alert to the caller to do the same and/or take appropriate corrective actions. Because such poisoned data does not provide any further information related to the source of the poison or the way this error needs to be handled, the system must rely on other means such as special logging registers (which are expensive to implement in hardware) to track the source of the error, whenever the poisoned memory is eventually read (consumed). This may also involve costly and time consuming procedures like scanning through the entire system hardware to trace the source of the error.

DETAILED DESCRIPTION OF EXAMPLE EMBODIMENTS

Figure 1:
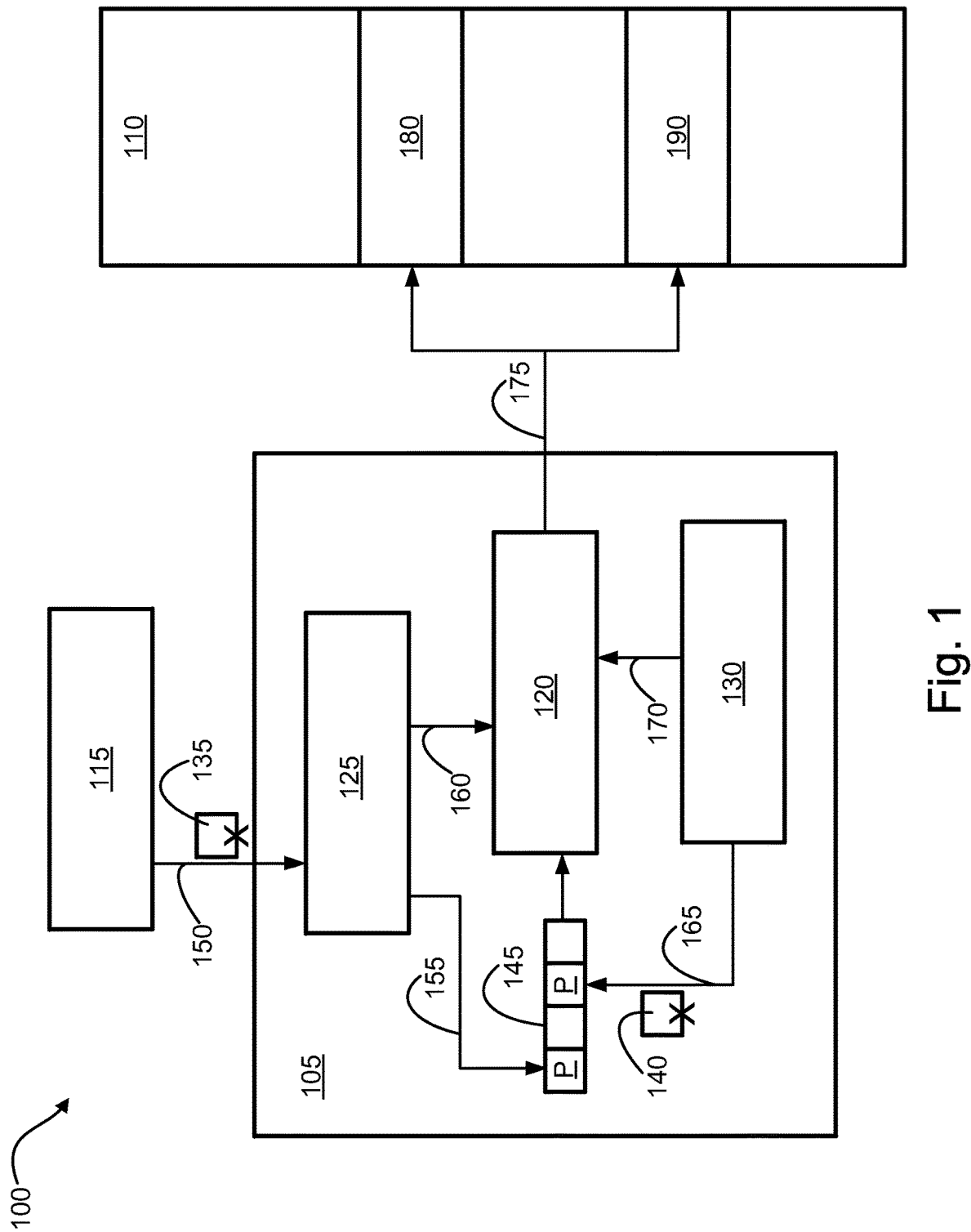
FIG. 1 is a block diagram of a system for storing hints in poisoned data in accordance with an example embodiment of the present invention showing the flow of poisoned data.

Embodiments of the present invention include methods and systems for memory poisoning that use the poisoned (e.g. bad or corrupted) memory data itself to store a hint regarding the poisoned data, for example, the source of the poisoned data. This may be accomplished in embodiments of the present invention because the memory location to which the poisoned memory data is written may include a special poison signature to signify the bad or corrupted nature of the data and a hint in the data field itself that provides further information regarding the poisoned memory data.

Embodiments of the present invention will now be described in detail, by way of example only, with reference to the accompanying drawings in which identical or corresponding parts/features are provided with the same reference numerals in the figures.

FIG. 1 is a block diagram of a system 100 for storing hints in poisoned data in accordance with an example embodiment of the present invention showing the flow of poisoned data. System 100 includes a CPU 105 and a system memory 110. Other components of the system 100 may communicate with the CPU 105, for example, a PCI Express device 115 or a higher level cache (not shown). The CPU 105 may include components such as PCI Express root port 125 or last level cache 130 that may communicate with other components of system 100, such as the above mentioned other components (e.g. 115) of the system 100, and may also communicate with a memory controller 120 of system 100. Accordingly, a component of system 100 such as PCI Express root port 125 may receive poisoned data, for example, a bad or corrupted Transaction Layer Packet (TLP) packet 135 from PCI Express root port 125 or last level cache 130 may receive poisoned data, for example, bad or corrupted data 140 received from a higher level cache (not shown). The poisoned data received by these components (e.g. 125, 130) may be forwarded to memory controller 120 by the receiving component, for example, in a direct memory access operation 155 by PCI Express root port 125 or a writeback operation 165 by last level cache 130, and placed in a queue 145 of pending requests to the memory controller 120. In addition, the receiving component (e.g. 125, 130) may forward additional data (e.g. 160 or 170) regarding the poisoned data (e.g. 135, 140) to the memory controller 120. The additional data may include, for example, the source of the poisoned data and/or suggestions for handling the poisoned data. The memory controller 120 may then, in turn, write the poisoned data (e.g. 135, 140) to the system memory 110 in a write operation 175. This writing operation 175 may include writing the poisoned data (e.g. 135 or 140) to the system memory 110 such that it includes a poison signature to identify the poisoned (bad or corrupted) nature of the data and/or a hint based on the additional data regarding the poisoned data (e.g. written memory locations 180 or 190). Specific examples of such hints are described in more detail below with respect to FIGS. 3A-3B and may include: a data field, called the hint packet, or simply the hint, that contains information about the poison source or any additional/related data such as the preferred method for handling the poison consumption or a pointer to a hint table in system memory 110 that contains such information. For example, if the poison data was received in a bad TLP packet sent by a PCI Express device 115, then the Requester ID of that device could be stored in the hint packet. If/when the written poisoned data (e.g. at 180 or 190) is eventually read or consumed a system error may be signaled by the memory controller 120 which also returns the poison signature and the hint, stored at memory locations 180 or 190 to a system software (e.g. operating system (OS) or basic input-output system (BIOS)) of the system 100.

In such a system 100, forwarders of poisoned data—such as the PCI Express root port 125 or last level cache 130—pass additional information (e.g. 160 or 170) to the memory controller 120, such as the poison source (e.g. Requester ID of PCI Express device 115), along with the poison data (e.g. 135 or 140) itself. The memory controller 120 may then use this combination of information to construct the hint as well as the poison signature, as shown in FIG. 1. When the poisoned memory (stored at memory locations 180 or 190) is finally consumed (read), the memory controller 120 may proceed to complete the operation, signal a platform error, and also return the hint into the calling logic of a system software of system 100 for further analysis. This enables the calling software to then interpret and report the hint as a part of the regular error reporting mechanism (e.g. Machine Check Data).

Therefore, the poison hint may help improve system reliability, availability, and serviceability (RAS) and Enhanced Error Containment and Recovery (EECR) in several ways:

1. It may quickly associate a poisoned memory data (e.g. 180 or 190) with its source (e.g. PCI Express device 115) and when the poisoned memory (e.g. 180 or 190) is consumed, the memory controller 120 may quickly retrieve the source information from the hints, and present that information (e.g. Requester ID of PCI Express device 115) to the system software (OS, BIOS) without the need to scan the entire system 100;

2. Because the hint is co-located with the poison signature (e.g. stored at memory locations 180 or 190), such a system 100 may help to avoid the need for expensive log registers in Silicon. For example, a hint table in system memory 110 may be built to contain as many error logs as needed for handling simultaneous errors (i.e. simultaneous reading of poisoned data which results in an error signal from memory controller 120);

3. Additionally, such a system 100 allows for the flexibility to implement a variety of schemes for providing hints. For example, the hint could include a preferred method of handling the poisoned data (e.g. 135, 140), for example: Message Signaled Interrupt (MSI), System Management Interrupt (SMI), or Machine Check Exception (MCE), plus the location of the poison source. Alternatively, a particular hint could involve a pointer to an error recovery method or the hint could instruct the system 100 to be reset; and 4. Furthermore, in such a system 100, cache lines in the last level cache 130 that belong to protected memory regions (e.g., critical OS/platform data or code) could be subject to malware attack. When these cache lines are written back to memory, for example in a writeback operation 165, the memory controller 120 may write them (175) to the system memory 110 as poisoned data with hints to indicate a malware attack and/or to point to the source of the attack and initiate attack recovery. For example, the hint could be the logical processor ID that triggered the malicious write operation 175 and the system software (e.g. the OS) can then choose to terminate the system software task running on that logical processor. Thus, the poison hint can assist platform robustness and enable recovery from cache-based malware attacks.

Figure 2:
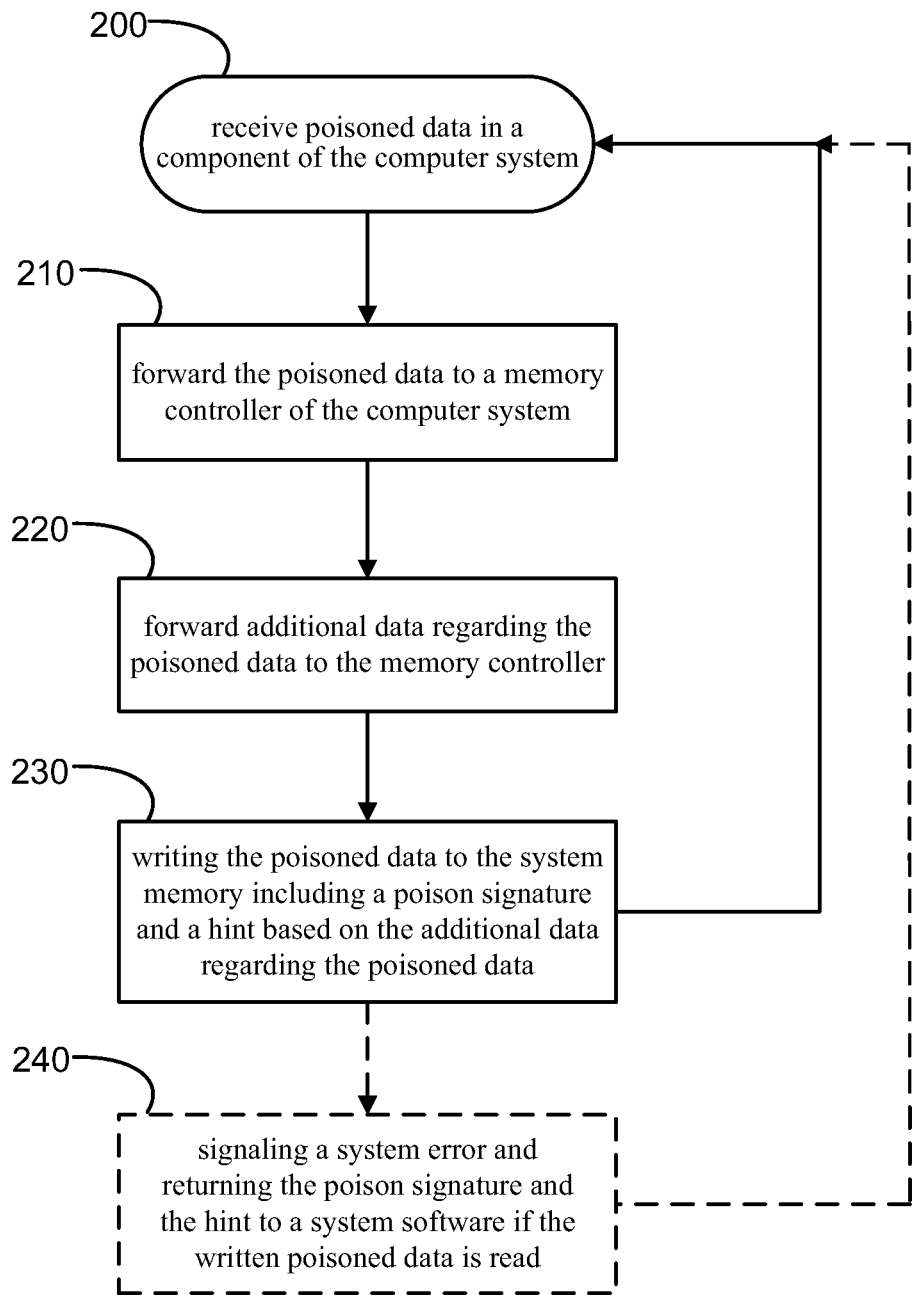
FIG. 2 is a flow chart of a method for storing hints in poisoned data according to an example embodiment of the present invention.

FIG. 2 is a flow chart of a method for storing hints in poisoned memory data of a system memory of a computer system according to an example embodiment of the present invention. In a first operation 200, poisoned data (e.g. 135 or 140) is received in a component (e.g. 125, 130, 404, 409, 412 or 430) of the computer system (e.g. 100, 305, 310, 400). In operation 210, the poisoned data (e.g. 135 or 140) is forwarded by the receiving component (e.g. 125, 130, 404, 409, 412 or 430), for example, in a direct memory access operation (e.g. 155) by a PCI Express root port (e.g. 125) or a writeback operation (e.g. 165) by a last level cache (e.g. 130) to a memory controller (e.g. 120, 416), and placed in a queue (e.g. 145) of pending requests to the memory controller (e.g. 120, 416). In operation 220 the receiving component (e.g. 125, 130, 404, 409, 412 or 430) forwards additional data (e.g. 160 or 170) regarding the poisoned data (e.g. 135 or 140) to the memory controller (e.g. 120, 416). As explained above the additional data (e.g. 160 or 170) may include, for example, the source of the poisoned data (e.g. Requester ID of PCI Express device 115) or suggestions for handling the poisoned data. In operation 230 the poisoned data (e.g. 135 or 140) is written (e.g. 175) by the memory controller (e.g. 120, 416) to the system memory (e.g. 110, 420) wherein the written poisoned data (e.g. 180 or 190) includes a poison signature (e.g. 182 or 192) and a hint (e.g. 184 or 194) based on the additional data (e.g. 160 or 170) regarding the poisoned data (e.g. 135 or 140). For example, the hint could indicate the source of the poisoned data (e.g. PCI Express device 115 or higher level cache lines) and if/when the source of the poisoned data is a protected memory region (e.g., critical OS/platform data or code) of the system (e.g. 100, 305, 310, 400) the memory controller (e.g. 120, 416) may flag the source (e.g. higher level cache lines) of the poisoned data (e.g. 140) as being under malware attack by including an indication of the malware attack in the hint constructed for said poisoned data (e.g. 140). In optional operation 240, if/when the written poisoned data (e.g. at 180 or 190) is consumed (read) a system error is signaled by the memory controller (e.g. 120, 416) which also returns the poison signature and the hint to a system software of the system (e.g. 100, 305, 310, 400).

Figure 3A:
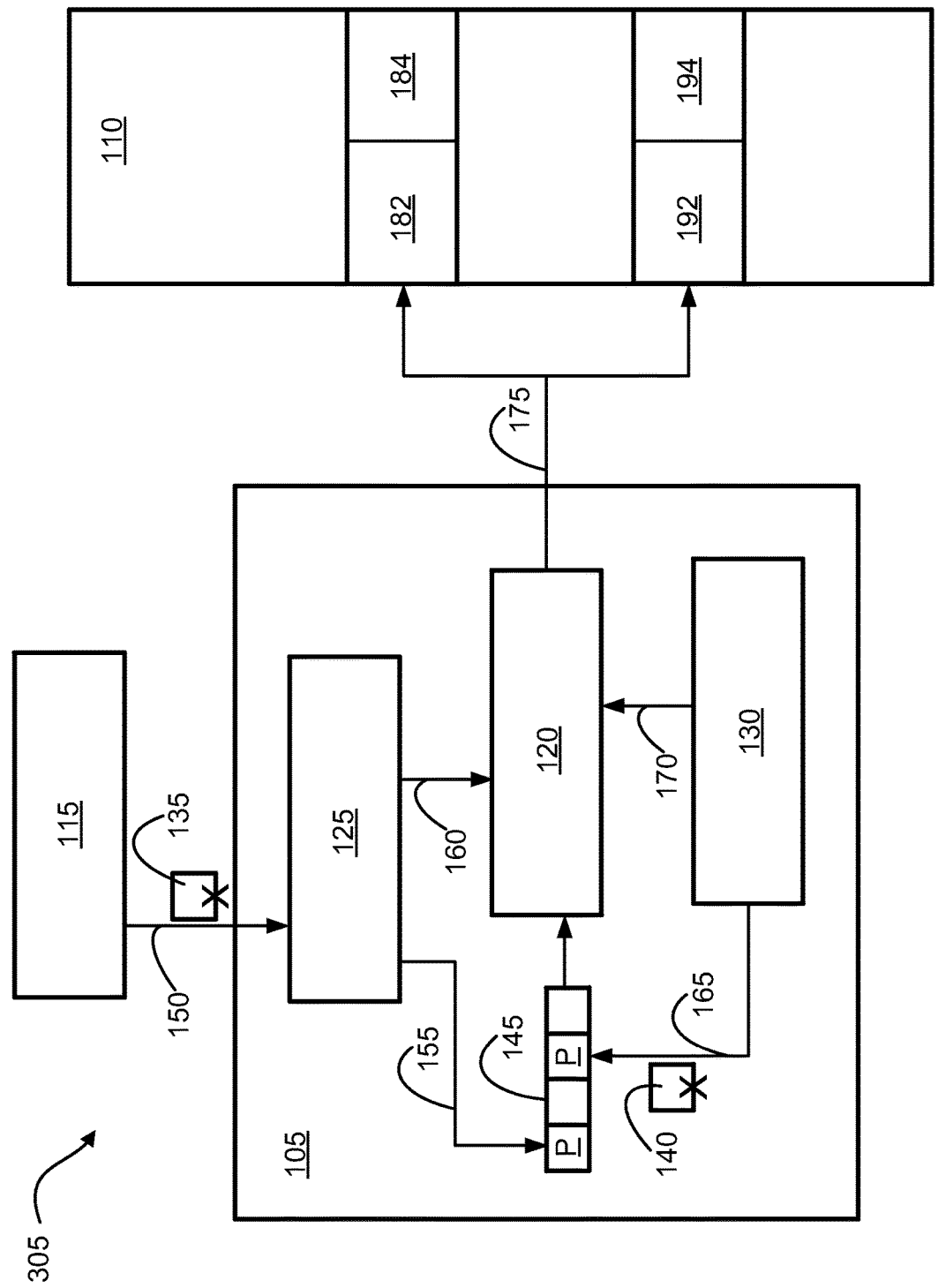
FIG. 3A is a block diagram of a system for storing hints in poisoned data in accordance with an example embodiment of the present invention showing the flow of poisoned data.
Figure 3B:
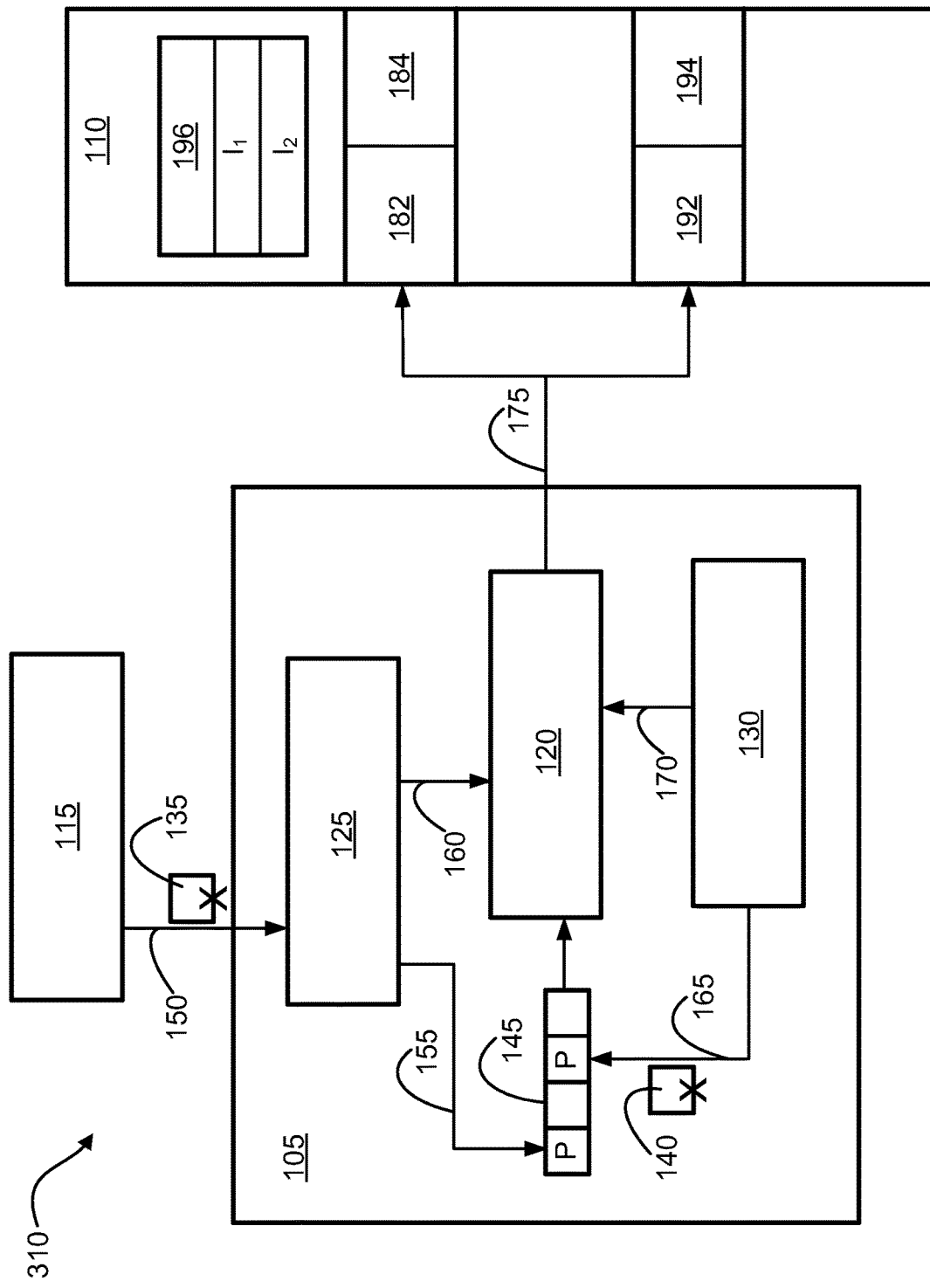
FIG. 3B is a block diagram of a system for storing hints in poisoned data in accordance with an example embodiment of the present invention showing the flow of poisoned data.

Systems 305 and 310, shown in FIGS. 3A and 3B, differ from system 100, shown in FIG. 1, only in the details of the poison signature (e.g. 182, 192) and hint (e.g. 184, 194) constructed by the memory controller 120 at memory location 180 and 190 based on poisoned data (e.g. 135 or 140) and additional data (e.g. 160 or 170) regarding the poisoned data (e.g. 135 or 140). In order to avoid repetition, the subsequent descriptions are limited to this aspect of the systems 305 and 310. Specific examples of hints (e.g. 184, 194) are described in more detail below with respect to FIGS. 3A and 3B and may include: a data field, called the hint packet, or simply the hint, that contains information about the poison data (e.g. 135 or 140) or a pointer to a hint table in system memory 110 that contains such information.

FIG. 3A is a block diagram of a system for storing hints in poisoned data in accordance with an example embodiment of the present invention showing the flow of poisoned data. In FIG. 3A, as in FIG. 1, the receiving component (e.g. 125, 130) may forward additional data (e.g. 160 or 170)

regarding the poisoned data (e.g. 135, 140) to the memory controller 120. As explained above, the additional data (e.g. 160 or 170) may include, for example, the source of the poisoned data (e.g. 135, 140) and/or suggestions for handling the poisoned data (e.g. 135, 140). The memory controller 120 may then, in turn, write the poisoned data (e.g. 135, 140) to the system memory 110 in a write operation 175. This writing operation 175 may include writing the poisoned data (e.g. 135 or 140) to the system memory 110 such that it includes a poison signature (e.g. 182, 192) to identify the poisoned (bad or corrupted) nature of the data and/or a hint (e.g. 184, 194) based on the additional data (e.g. 160 or 170) regarding the poisoned data (e.g. 135, 140). In system 305 the hints 184 and 194 include a data field, called the hint packet, or simply the hint, that may contain data about the poison source or any additional/related information such as a preferred method to handle the poison consumption. For example, if the poison data was received in a bad TLP packet sent by a PCI Express device 115, then the Requester ID of that device could be stored in the hint packet. Alternatively or in addition the hint could include a preferred method of handling the poisoned data (e.g. 135, 140), for example: Message Signaled Interrupt (MSI), System Management Interrupt (SMI), or Machine Check Exception (MCE). As in FIG. 1, if/when the written poisoned data (e.g. 182, 192, 184, 194) is read a system error may be signaled by the memory controller 120 which also returns the poison signature (e.g. 182, 192) and the hint (e.g. 184, 194) to a system software (e.g. OS or BIOS) of the system 100.

FIG. 3B is a block diagram of a system for storing hints in poisoned data in accordance with an example embodiment of the present invention showing the flow of poisoned data. In FIG. 3A, as in FIG. 1, the receiving component (e.g. 125, 130) may forward additional data (e.g. 160 or 170) regarding the poisoned data (e.g. 135, 140) to the memory controller 120. As explained above, the additional data (e.g. 160 or 170) may include, for example, the source of the poisoned data (e.g. 135, 140) and/or suggestions for handling the poisoned data (e.g. 135, 140). The memory controller 120 may then, in turn, write the poisoned data (e.g. 135, 140) to the system memory 110 in a write operation 175. This writing operation 175 may include writing the poisoned data (e.g. 135 or 140) to the system memory 110 such that it includes a poison signature (e.g. 182, 192) to identify the poisoned (bad or corrupted) nature of the data and/or a hint (e.g. 184, 194) based on the additional data (e.g. 160 or 170) regarding the poisoned data (e.g. 135, 140). In system 310 the hints 184 and 194 include pointers to table entries (e.g. indexes: $I_1$ and $I_2$) of a hint table 199 in system memory 110. The indexes (e.g. $I_1$ and $I_2$) may contain data about the poison source or any additional/related information such as a preferred method to handle the poison consumption. For example, if the poison data was received in a bad TLP packet sent by a PCI Express device 115, then the Requester ID of that device could be stored in an index (e.g. $I_1$ and $I_2$) of the hint table 199. Alternatively or in addition the hint table may include a preferred method of handling the poisoned data (e.g. 135, 140), for example: a particular hint could involve a pointer to an error recovery method or a pointer to an instruction for the system 310 to be reset. The hint table 199 in system memory 110 may be built to contain as many error logs (e.g. indexes: $I_1$ and $I_2$) as needed for handling simultaneous errors (i.e. simultaneous reading of poisoned data which results in an error signal from memory controller 120). As in FIG. 1, if/when the written poisoned data (e.g. 182, 192, 184, 194) is read a system error may be signaled by the memory controller 120 which also returns the poison signature (e.g. 182, 192) and the hint (e.g. 184, 194) to a system software (e.g. OS or BIOS) of the system 100.

Figure 4:
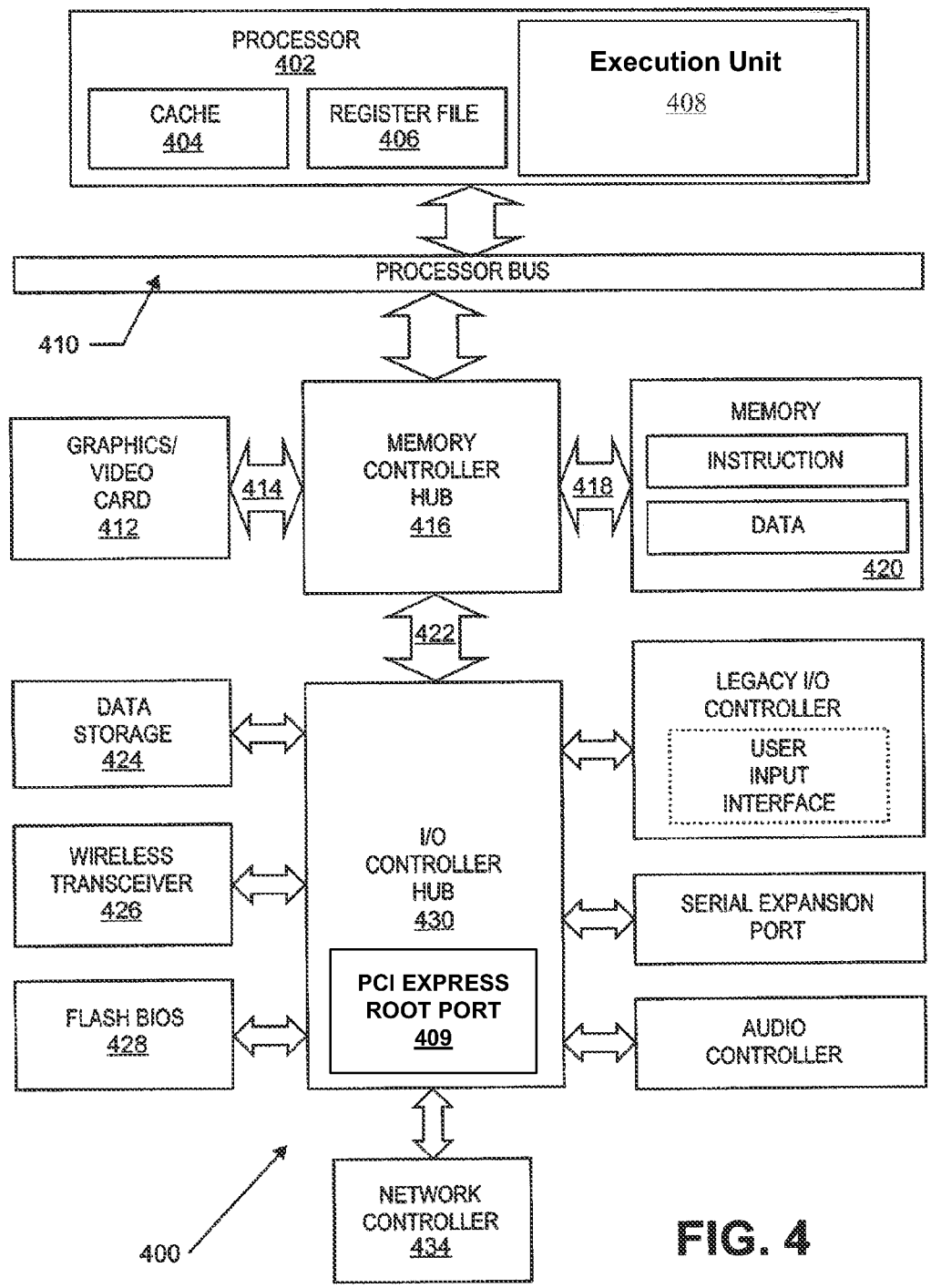
FIG. 4 is a block diagram of a system for storing hints in poisoned data in accordance with an example embodiment of the present invention.

FIG. 4 is a block diagram of a system for storing hints in poisoned data in accordance with an example embodiment of the present invention. System 400 includes a memory controller 416 (the system logic chip 416 coupled to the processor bus 410 and memory 420 in the illustrated embodiment is a memory controller hub (MCH 416)) which can process data, in accordance with the present invention, such as in the embodiment described herein. System 400 is representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 400 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

FIG. 4 is a block diagram of a computer system 400 formed with processor 402 that includes an execution unit 408 and a register file 406 for storing different types of data in various registers. One embodiment may be described in the context of a single processor desktop or server system, but alternative embodiments can be included in a multiprocessor system. System 400 is an example of a 'hub' system architecture. The computer system 400 includes a processor 402 to process data signals. The processor 402 is coupled to a processor bus 410 that can transmit data signals between the processor 402 and other components in the system 400. The elements of system 400 perform their conventional functions that are well known to those familiar with the art.

In one embodiment, the processor 402 includes a Level 1 (L1) internal cache memory 404. Depending on the architecture, the processor 402 can have a single internal cache or multiple levels of internal cache. Alternatively, in another embodiment, the cache memory can reside external to the processor 402. Other embodiments can also include a combination of both internal and external caches depending on the particular implementation and needs. Register file 406 can store different types of data in various registers including integer registers, floating point registers, status registers, and instruction pointer register.

System 400 includes a memory 420. Memory 420 can be a dynamic random access memory (DRAM) device, a static random access memory (SRAM) device, flash memory device, or other memory device. Memory 420 can store instructions and/or data represented by data signals that can be executed by the processor 402.

A system logic chip 416 is coupled to the processor bus 410 and memory 420. The system logic chip 416 in the illustrated embodiment is a memory controller hub (MCH 416). The processor 402 can communicate to the MCH 416 via a processor bus 410. The MCH 416 provides a high bandwidth memory path 418 to memory 420 for instruction and data storage and for storage of graphics commands, data and textures. The MCH 416 is to direct data signals between the processor 402, memory 420, and other components in the system 400 and to bridge the data signals between processor bus 410, memory 420, and system I/O 422. In some embodiments, the system logic chip 416 can provide a graphics port for coupling to a graphics controller 412. The MCH 416 is coupled to memory 420 through a memory interface 418. The graphics card 412 is coupled to the MCH 416 through an Accelerated Graphics Port (AGP) interconnect 414.

In such a system 400, potential forwarders of poisoned data to the MCH 416—such as 404, 409, 412 or 430—also pass additional information to the MCH 416, such as the poison data source (e.g. Requester ID of a PCI Express device in communication with PCI Express root port 409), along with the poison data itself. The MCH 416 may then use this combination of information to construct a hint as described above as well as a poison signature when it writes the data to system memory 420. When the poisoned memory (stored in system memory 420) is finally consumed (read), the MCH 416 may proceed to complete the operation, signal a system error, and also return the constructed hint into the calling logic of a system software of system 400 for further analysis. This enables the calling software to then interpret and report the hint as a part of the regular error reporting mechanism (e.g. Machine Check Data).

System 400 uses a proprietary hub interface bus 422 to couple the MCH 416 to the I/O controller hub (ICH) 430. The ICH 430 provides direct connections to some I/O devices via a local I/O bus and may include a PCI Express root port 409. The local I/O bus is a high-speed I/O bus for connecting peripherals to the memory 420, chipset, and processor 402. Some examples are the audio controller, firmware hub (flash BIOS) 428, wireless transceiver 426, data storage 424, legacy I/O controller containing user input and keyboard interfaces, a serial expansion port such as Universal Serial Bus (USB), and a network controller 434. The data storage device 424 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A system comprising:
a system memory; and
a processor coupled to the system memory, the processor comprising:
integer registers;
floating point registers;
a status register;
an instruction pointer register;
a level 1 (L1) cache; and
cache circuitry comprising a second cache, wherein the second cache is at a higher level than the L1 cache, the cache circuitry to:
identify corrupted data to be stored in a cache line in the second cache; store the corrupted data, along with a poison identifier, in the cache line of the second cache, the poison identifier to identify a corrupted nature of the corrupted data;
output the cache line including the corrupted data from the second cache; output information related to a source of the corrupted data, wherein the information related to the source of the corrupted data is to be output to a component other than an error log of the processor; and
provide information related to how to handle the corrupted data.

2. The system of claim 1, wherein the information related to the source of the corrupted data is to be provided to a controller.

3. The system of claim 1, wherein the processor is also to provide a logical processor ID associated with a corrupted data.

4. The system of claim 1, wherein the information related to the source of the corrupted data indicates the second cache.

5. The system of claim 1, wherein the processor is to signal an error when the corrupted data is read.

6. The system of claim 1, wherein the system memory comprises a dynamic random access memory (DRAM).

7. The system of claim 1, further comprising a mass storage device coupled to the processor.

8. The system of claim 7, wherein the mass storage device comprises a flash memory device.

9. The system of claim 7, wherein the mass storage device comprises a hard disk drive.

10. The system of claim 1, further comprising a wireless transceiver coupled to the processor.

11. The system of claim 1, further comprising an input/output (I/O) device coupled to the processor.

12. The system of claim 1, further comprising a Peripheral Component Interconnect (PCI) Express endpoint coupled to the processor.

13. The system of claim 1, further comprising:
a Peripheral Component Interconnect (PCI) Express root port; and
a device coupled to the PCI Express root port.

14. The system of claim 1, further comprising a network controller coupled to the processor.

15. The system of claim 1, further comprising a graphics card coupled to the processor.

16. A system comprising:
a network controller;

a mass storage device;
a system memory; and
a processor coupled to the network controller, the mass storage device, and the system memory, the processor comprising:
   integer registers;
   floating point registers;
   a status register;
   an instruction pointer register;
   a level 1 (L1) cache; and
   cache circuitry comprising a second cache, wherein the second cache is at a higher level than the L1 cache, the cache circuitry to:
      identify corrupted data to be stored in a cache line in the second cache;
      store the corrupted data, along with a poison identifier, in the cache line of the second cache, the poison identifier to identify a corrupted nature of the corrupted data;
      output the cache line including the corrupted data from the second cache;
      output information related to a source of the corrupted data, wherein the information related to the source of the corrupted data is to be output to a component other than an error log of the processor, wherein the information related to the source of the corrupted data is to be provided to a controller, wherein the information related to the source of the corrupted data indicates the second cache; and
      provide information related to how to handle the corrupted data,
   wherein the processor is to signal an error when the corrupted data is read.

17. A method performed by a system having a processor, the method comprising:
   storing data in a system memory;
   storing data in integer registers;
   storing data in floating point registers;
   storing data in a status register;
   storing data in an instruction pointer register;
   storing data in a level 1 (L1) cache;
   storing data in a second cache, wherein the second cache is at a higher level than the L1 cache;
   identifying corrupted data to be stored in a cache line in the second cache;
   storing the corrupted data, along with a poison identifier, in the cache line of the second cache, the poison identifier identifying a corrupted nature of the corrupted data;
   outputting the cache line including the corrupted data from the second cache;
   outputting information related to a source of the corrupted data, wherein the information related to the source of the corrupted data is output to a component other than an error log of the processor; and
   providing information related to how to handle the corrupted data.

18. The method of claim 17, wherein outputting the information comprises outputting the information related to the source of the corrupted data to a controller.

19. The method of claim 17, further comprising providing a logical processor ID associated with a corrupted data.

20. The method of claim 17, wherein outputting the information comprises outputting the information related to the source of the corrupted data that indicates the second cache.

21. The method of claim 17, further comprising signaling an error when the corrupted data is read.

22. The method of claim 17, wherein said storing the data in the system memory comprises storing the data in a dynamic random access memory (DRAM).

23. The method of claim 17, further comprising storing data in a mass storage device.

24. The method of claim 17, further comprising receiving data from a Peripheral Component Interconnect (PCI) Express endpoint.

* * * * *